United States Patent [19]

Kawada et al.

[11] Patent Number: 5,358,375
[45] Date of Patent: Oct. 25, 1994

[54] DEVICE FOR TRANSFERRING MATERIALS AND PRODUCT WITH RESPECT TO A PROCESSING MACHINE

[75] Inventors: Kijuu Kawada, Atsugi; Yukio Uchino, Odawara, both of Japan

[73] Assignee: Amada Company, Limited, Japan

[21] Appl. No.: 956,013

[22] PCT Filed: Apr. 8, 1992

[86] PCT No.: PCT/JP92/00438

§ 371 Date: Dec. 9, 1992

§ 102(e) Date: Dec. 9, 1992

[87] PCT Pub. No.: WO92/18286

PCT Pub. Date: Oct. 29, 1992

[30] Foreign Application Priority Data

Apr. 11, 1991 [JP] Japan .................. 3-79365

[51] Int. Cl.⁵ .............................................. B65G 1/04
[52] U.S. Cl. .................................... 414/277; 414/222; 414/331
[58] Field of Search ................ 414/277, 278, 280–282, 414/222, 331, 659, 660, 662

[56] References Cited

U.S. PATENT DOCUMENTS

| | | | |
|---|---|---|---|
| 2,341,434 | 2/1944 | Forbes | 414/280 |
| 2,624,470 | 1/1953 | Geist | 414/281 X |
| 2,646,177 | 7/1953 | Nussbaum et al. | 414/280 |
| 3,501,028 | 3/1970 | Crile | 414/282 X |
| 3,782,564 | 1/1974 | Burt | 414/277 X |
| 4,035,904 | 7/1977 | Ishizaka et al. | 414/222 X |
| 4,405,277 | 9/1983 | Bürkner | 414/277 X |
| 4,558,983 | 12/1985 | Freeman et al. | 414/331 |
| 4,932,828 | 6/1990 | Katae et al. | 414/278 X |
| 4,969,791 | 11/1990 | Stolzer | 414/280 |
| 5,104,277 | 4/1992 | Bullock | 414/280 |

FOREIGN PATENT DOCUMENTS

| | | |
|---|---|---|
| 0302542 | 2/1989 | European Pat. Off. . |
| 3644517 | 7/1988 | Fed. Rep. of Germany ...... 414/277 |
| 48802 | 3/1985 | Japan .................. 414/277 |
| 64-45528 | 2/1989 | Japan . |
| 64-45531 | 2/1989 | Japan . |
| 2-139160 | 5/1990 | Japan . |

Primary Examiner—David A. Bucci

[57] ABSTRACT

A device for transferring materials and product with respect to a worktable (13) of a processing machine (1), including stackers (5R, 5L) provided with a plurality of pallet shelves (3) to and from which material and product pallets are passed and discharged, and a pallet carrying elevator (75) disposed in a vertically movable manner with respect to the stackers, for supporting and moving the material and product pallets with respect to the shelves (3), the pallet carrying elevator (75) being provided at an upper portion with a work holding device (109) and at a lower portion with a supporting device (95) for supporting and releasing a processing pallet (Pk) to pass and discharge it (Pk) with respect to worktable (13) of the processing machine.

7 Claims, 5 Drawing Sheets

DEVICE FOR TRANSFERRING MATERIALS AND PRODUCT WITH RESPECT TO A PROCESSING MACHINE

TECHNICAL FIELD

This invention relates to a transfer device for transferring materials and products with respect to a processing machine such as a laser processing machine, and in particular to a transfer device for transferring to and from a pallet stacker pallets on which the materials and products are carried.

BACKGROUND ART

Conventionally, an automated structure or warehouse which serves as a stacker for storing pallets carrying materials or products, is known. The automated warehouse is disposed apart a certain distance from a processing machine which may be, for example, a laser processing machine. Accordingly, when the material is taken out of the automated warehouse to be processed into products by the processing machine, the material is transferred from the automated warehouse to the processing machine through a loading device. In addition, the products processed by the processing machine are transferred therefrom to the automated warehouse through a unloading device, at present.

By the way, as is mentioned above, the loading and unloading devices are demanded and arranged to be used in the prior art, for transferring the materials and products between the stacker and the processing machine, and therefore it causes a problem that relative the is required both for moving the materials from the stacker to the processing machine and for discharging the products from the processing machine to the stacker.

The object of the present invention is to provide an improved transfer device for transferring materials and products with respect to a processing machine adjacent to which a stacker is disposed, wherein pallets for carrying the materials or products are automatically passed to and discharged from the stacker as well as processing machine for relatively short time and as a result working efficiency or productivity of the processing machine is increased.

DISCLOSURE OF INVENTION

In order to attain the above-mentioned object, a transfer device of the present invention for transferring materials and products includes a pallet stacker disposed adjacent to a processing machine and having a plurality of pallet shelves; and a pallet carrying elevator for supporting and vertically moving with respect to the pallet stacker a pallet which carries the material or product, wherein the pallet carrying elevator includes a pallet supporting device (95) which for the purposes of passing and discharging the pallet with respect to the processing machine can be switched or shifted to either non-supporting condition in which the pallet is released on the processing machine, or supporting condition in which the pallet is supported on the processing machine.

This invention is configured in another example as a transfer device for transferring materials and products with respect to a processing machine, including a stacker having a plurality of shelves to and from which material or product pallets are passed and discharged; a pallet carrying elevator provided in a vertically movable manner for supporting the pallet discharged from the shelves; a holding device provided under the pallet carrying elevator, for holding and releasing a processing pallet supported on a table of the processing machine; and a work holding portion provided above the pallet carrying elevator, for holding the material and product on any pallet supported by the pallet carrying elevator.

This invention is configured in a further example as a transfer device for transferring materials and products with respect to a processing machine, including first and second stackers disposed adjacent to each other, each stacker having a plurality of pallet shelves to and from which a plurality of material or product pallets are passed and discharged; a vertically movable pallet carrying elevator extending between the first and second stackers, the pallet carrying elevator being provided with first and second pallet supporters, the first pallet supporter being able to support the material or product pallet discharged to a position corresponding to the first stacker, the second pallet supporter being able to support the material or product pallet at a position corresponding to the second stacker; a supporting device for supporting and releasing a processing pallet to be supported on a worktable of the processing machine, the processing pallet supporting device being mounted under the first and the second pallet supporters; a slider mounted on the pallet carrying elevator, for moving to and fro between the positions corresponding to the first and second stackers; and a work holding portion mounted on the slider, for holding and releasing the material or product on the material, product, or processing pallet supported on the first and second pallet supporters.

By means of the transfer device of the present invention for transferring materials and products, the pallet carrying elevator is vertically moved and positioned at a shelf selected from the shelves vertically arranged in the pallet stacker. After it, the material is hold by the work holding means mounted on an upper portion of the pallet carrying elevator, while the pallet is passed or returned onto the original shelf. Then, the pallet carrying elevator is descended, and the materials are passed to the processing machine by which the materials is processed into a product.

After the completion of the processing, the pallet carrying elevator is descended in order to hold the product by the work holding means and then lifted to store the product on a shelf of the stacker.

BEST MODE FOR CARRYING OUT THE INVENTION

Figure 1:
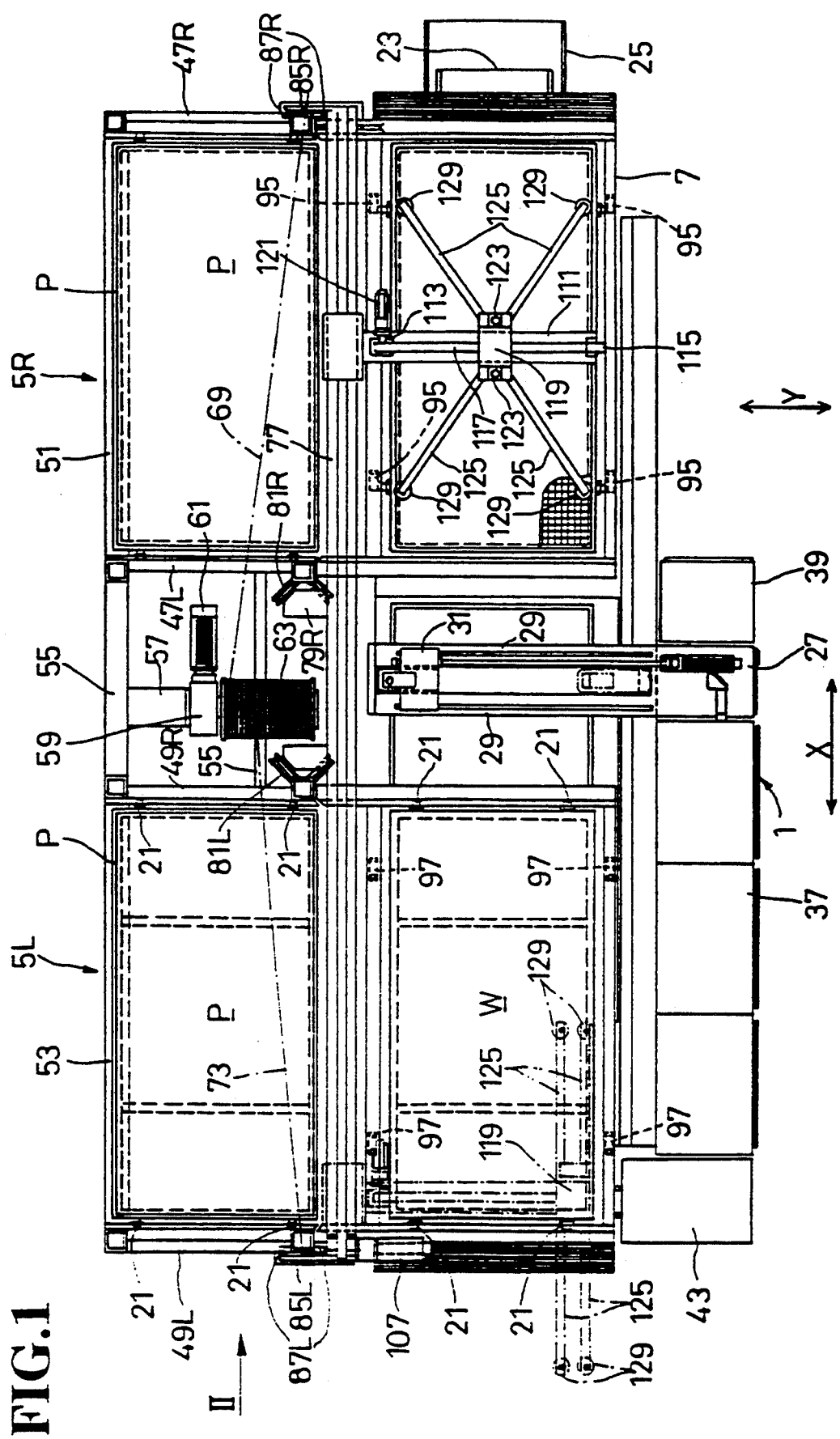
FIG. 1 is a plan view showing a processing machine and a transfer device of the present invention for transferring materials and products with respect to the processing machine.

Now, the present invention is explained in detail with reference to the accompanying drawings.

With reference to FIGS. 1-4, a laser processing apparatus as a processing machine 1 is installed on the floor. Behind the processing machine 1 (on the left-side in FIG. 2) first and second stackers 5R, 5L each of which is provided with a plurality of vertically arranged shelves, are installed. Pallets P for carrying materials W or products G are stored on the shelves in a manner that the pallets P are passed or put on the shelves and discharged from the shelves.

First, the laser processing apparatus 1 is explained. The laser processing apparatus is provided with a box-shaped base 7. Guide falls 9 which extend in X-direction are provided on Y-direction sides of the base 7. A worktable 13 is movably disposed on the guide rails 9 through guide members 11. The worktable 13 is moved in the X-direction along the guide rails 9 by means of a nut member 15 attached to a lower portion of the worktable 13 and threadably engaged by a motor-driven ball screw 17 (the motor is not shown in the drawings). The worktable is so designed as to stand at an intermediate position between the first and second stackers as well as positions in front of the stackers.

A square pallet P which supports a material W is put on the worktable 13. The pallet P is clamped or unclamped by a plurality of clampers 19 disposed on the right-side of the worktable 13 in FIG. 2. The work clampers 19 to be used are of a known type, and therefore a further detailed description about the clampers is omitted. A plurality of, for example, four guide rollers 21 are rotatably attached to front and rear portions of X-direction sides of the pallet P as shown in FIG. 1.

By the above configuration, when the motor (not shown) is operative the worktable 13 on which the pallet P for carrying the material W is clamped by the clampers 19, is smoothly moved in the X-direction while guided through the guide members 11 along the guide rails 9.

Figure 4:
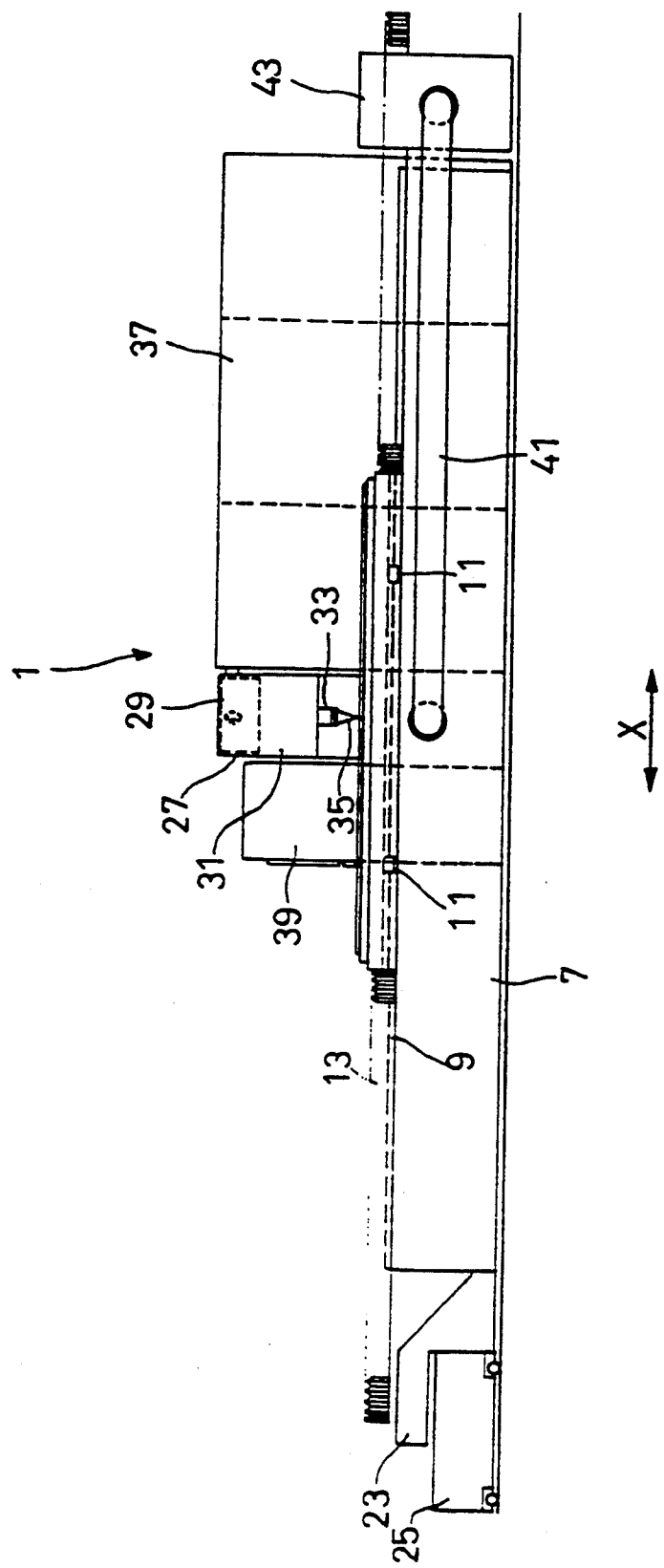
FIG. 4 is a elevation view shown by arrow IV in FIG. 2.

A chip conveyor 23 is disposed in the base 7 as shown in FIG. 4 (on the left side), and a movable scrap box 25 is arranged under the chip conveyor 23.

Figure 2:
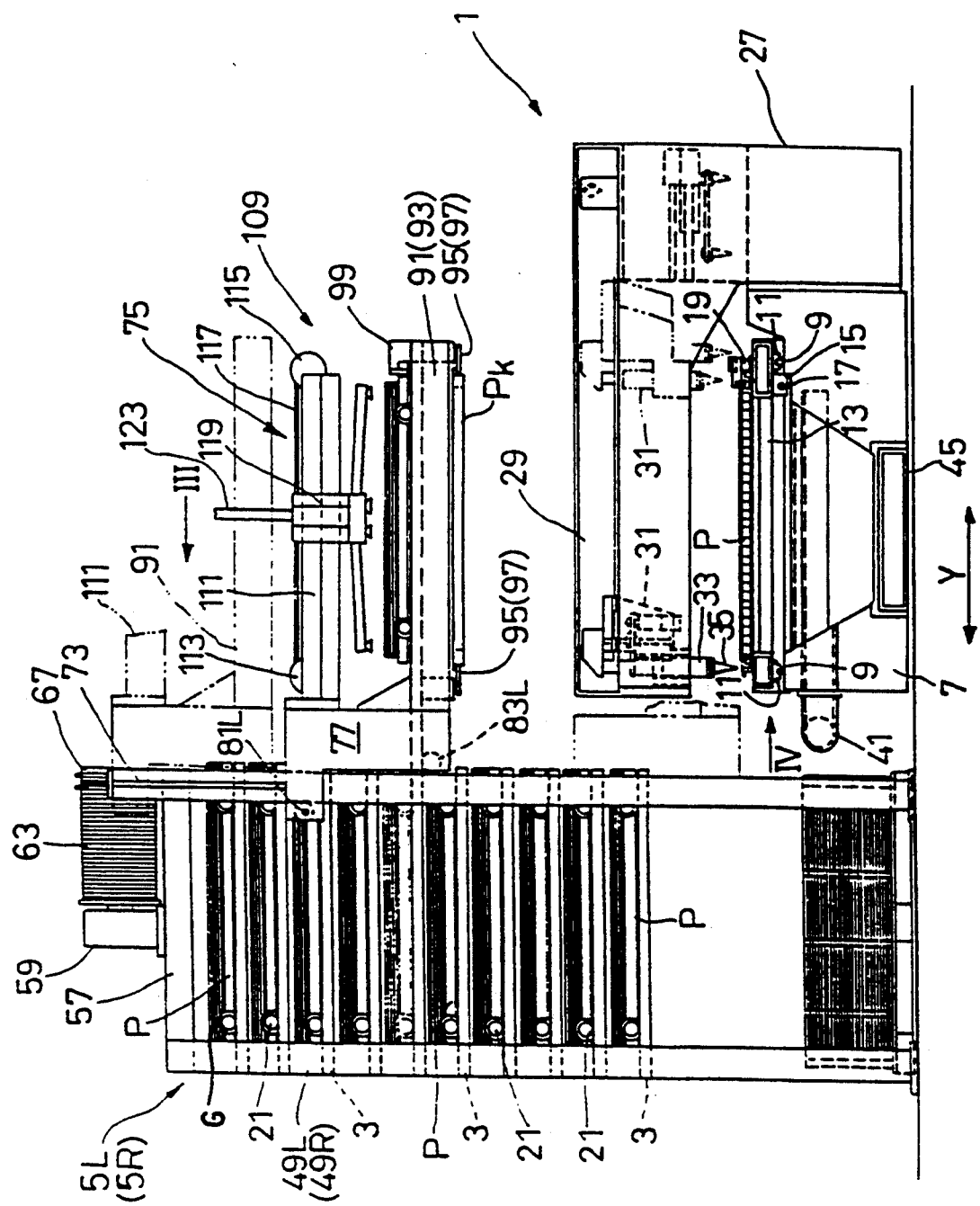
FIG. 2 is a side view shown by arrow II in FIG. 1.

At a nearly central part in the X-direction of base 7 a column 27 is installed as shown in FIGS. 2 and 4. A pair of cantilevers 29, 29 extending in the Y-direction are provided on the top of the column 27. A Y-axis moving body 31 movable in the Y-direction is mounted on the cantilevers 29, 29.

Owing to the above configuration, the Y-axis moving body 31 is smoothly moved in the Y-axis direction by means of a driving mechanism comprised of, for example, a nut member and a ball screw rotated by a motor (not shown).

The Y-axis moving body 31 is provided with a laser processing head 33 which is vertically moved in Z-direction by a drive device (not shown), for example, comprised of a ball screw and a screw nut. A laser nozzle 35 is attached to a lower portion of the laser processing head 33.

Accordingly, the laser nozzle 35 is moved in the X-, Y- and Z-directions so that two-dimensional processing can be performed with respect to a two-dimensional material.

On a side of the column 27 (on the lower left-side in FIG. 1 and right-side in FIG. 4) a laser generator 37 is disposed. Laser beams generated and emitted by the laser generator 37 are guided by a plurality of refracting mirrors and projected from the laser nozzle 35 onto the material W to be processed.

Furthermore, a NC device for controlling the laser processing apparatus 1 in various matters is provided on the right-side of the column 27 in FIG. 1 (on the left in FIG. 4). An end of a suction duct 41 is connected to the above-mentioned base 7 on which laser processing is performed, while the other end of the suction duct 41 is connected to a suction box 43. Furthermore, a box 45 for containing residuals and small products is disposed under the base 7.

Now, the first and second stackers 5R, 5L are explained in detail. The stackers 5R and 5L are frame structures mainly consisting of upright right and left side-frame members 47R 47L; 49R, 49L respectively and horizontal frame members 51, 53 which connect the tops of the upright right and left side-frame members 47R and 47L; 49R and 49L.

A plurality of vertically arranged shelves 3 are mounted between the upright right and left side-frame members 47R and 47L; 49R and 49L. The pallets P which carries the materials W or the products G and are provided with the outer guide rollers 21 are supported and stored on the shelves 3.

Two girders 55, 55 are bridged between the upper horizontal frames 51 and 53, and a supporting beam 57 is bridged on the girders 55 and 55 as shown in FIG. 1. A gear box 59 is mounted on the supporting beam 57, and a drive motor 61 is connected in a driving manner to the gear box 59. The gear box 59 is connected in a driving manner to a wire drum 63 mounted on the supporting beam 57 in a rotatable manner.

Figure 3:
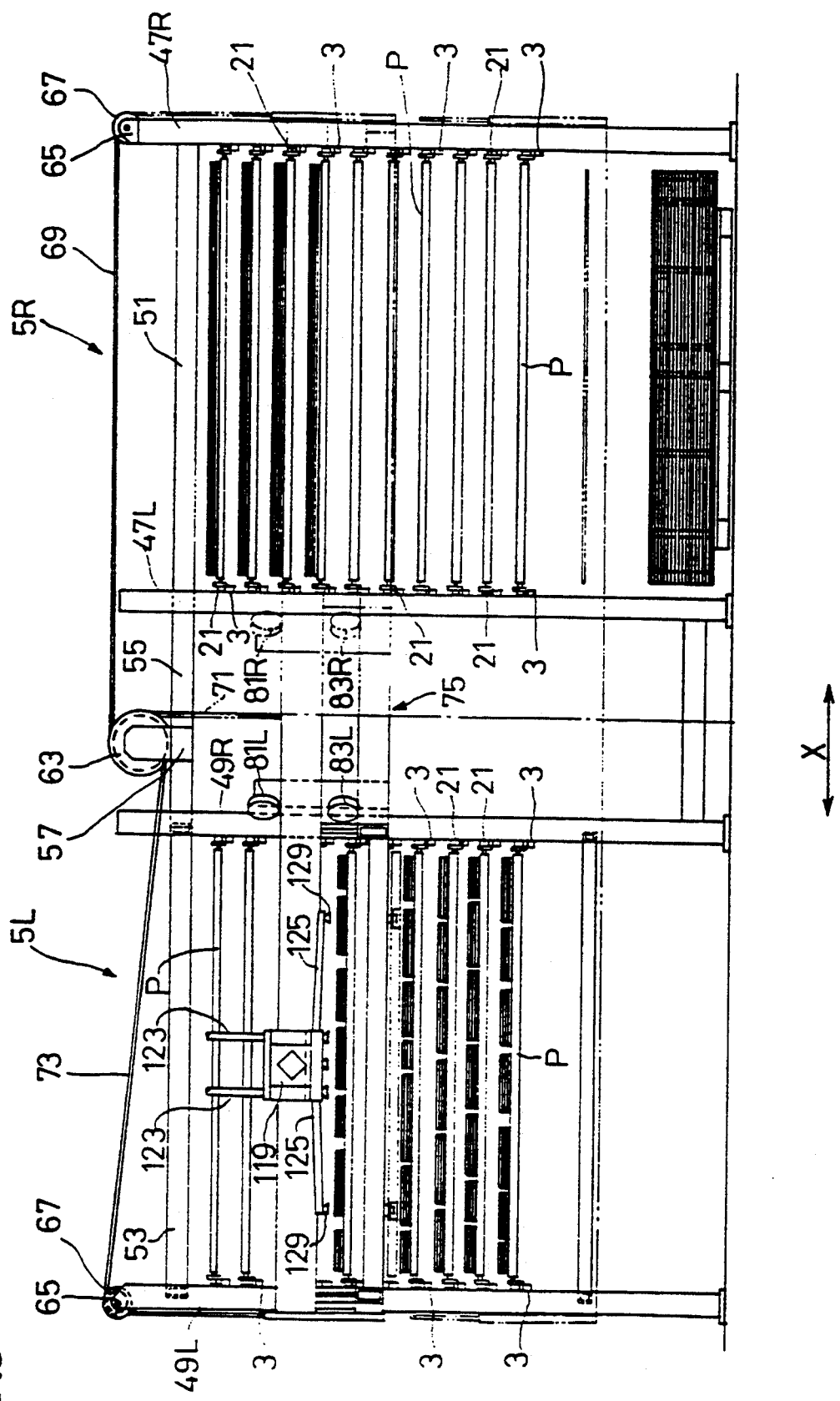
FIG. 3 is a elevation view shown by arrow III in FIG. 2.

Pulleys 67, 67 are rotatably mounted through brackets 65, 65 on front corners of the side-frame members 47R and 49L as shown in FIG. 3. Three wires 69, 71, and 73 are wound around the drum 63. Proximal ends of the three wires 69, 71, and 73 are fixed to the drum, while distal ends of the wires 69 and 73 are secured through the pulleys 67 and 67 to both sides of the pallet carrying elevator 75 and a distal end of the remaining wire 71 is directly connected to a central part of the elevator 75.

Owing to the above configuration, when the drive motor 61 is operative the wire drum 63 is rotated through gear box 59. The rotation of the drum 63 winds up the wires and therefore lifts the elevator. When the drive motor 61 is rotated in the opposite direction the wires are wound off and as a result the elevator is lowered.

Figure 5:
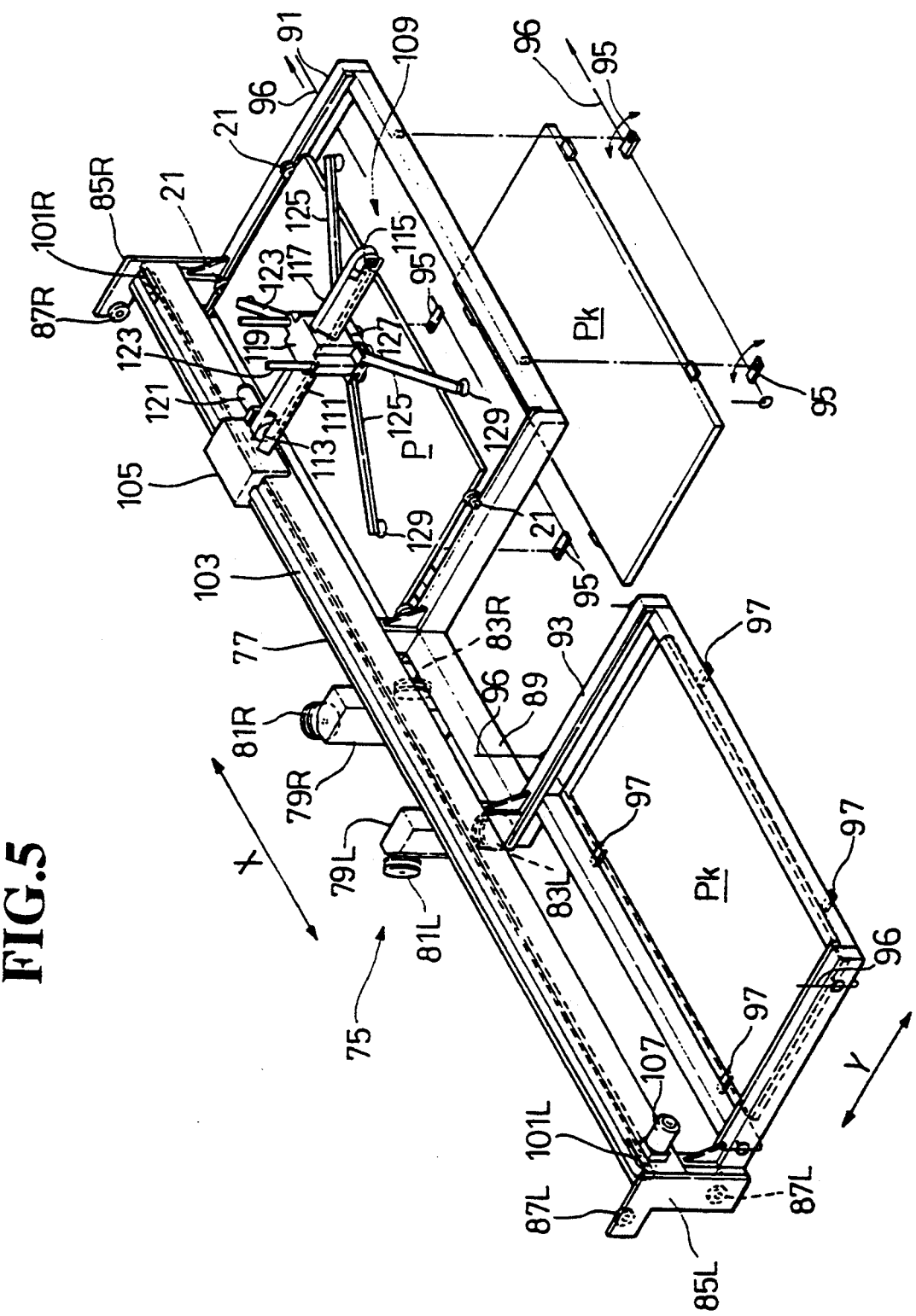
FIG. 5 is a perspective view showing a pallet carrying elevator of the transfer device shown in FIGS. 1–4.

With reference to FIG. 5 as well as FIGS. 1-3, the pallet carrying elevator 75 is provided with a supporting frame 77 extending in the X-direction. Two supporting blocks 79R and 79L are integrally fixed to a rear central part of the supporting frame 77. Four vertically arranged grooved rollers 81R, 83R, 81L, 83L two by two are rotatably attached to the supporting blocks 79R; 79L. The grooved roller 81R and 83R; 81L and 83L are disposed at different heights and at right angles so that they can associate with front vertical members of the upright side-frame members 47L and 49R to act as guide rollers when the pallet carrying elevator 75 is vertically moved. Thus, the elevator 75 is smoothly moved in the vertical direction.

In addition, the pallet carrying elevator 75 is provided at both sides with brackets 85R, 85L to which a pair of guide roller 87R and 87L one by one are attached in a rotatable manner for being in contact with and guided by front vertical members of the inside upright side-frame members 47R and 49L of the first and second stackers 5R and 5L. The guide rollers 87R, 87L act as guides when the elevator 75 is vertically moved.

A lower supporting frame 89 is mounted under the supporting frame 77. The lower supporting frame 89 extends between the supporting blocks 79R and 79L. As shown in FIG. 5, a first pallet supporter 91 in the shape of a frame for carrying a material pallet P and a product pallet Pk at a position corresponding to the first stacker 5R, is integrally fixed to a right-hand end of the lower supporting frame 89 and the right-hand bracket 85R. Similarly, a second pallet supporter 93 in the shape of a frame for carrying a material pallet: P and a product pallet Pk at a position corresponding to the second stacker 5L, is integrally fixed to a left-hand end of the lower supporting frame 89 and the left-hand bracket 85L.

A plurality of supporting pieces 95 and 97, which act as a supporting device for supporting and releasing the processing pallet Pk by engaging and disengaging the processing pallet Pk with respect to the pallet carrying elevator 75, are rotatably attached under the first and second pallet supporters 91, 93. The supporting pieces 95, 97 are engaged with pull strings or wires 96 both ends of which are connected to conventional drive means such as pistons (not shown). Therefore, the wires 96 are pulled in a right- or left-hand direction, or in a clockwise or counterclockwise direction.

In addition, a known traverser 99 for withdrawing from any shelf a pallet P, which carries the materials, and returning the pallet to any desired shelf, is provided as shown in FIG. 2.

Furthermore, as shown in FIG. 5, pulleys 101R, 101L are rotatably attached to ends of the supporting frame 77. A belt 103 is engaged around the pulleys 101R, 101L. A slider 105 for moving in the Y-direction is integrally attached to a part of the belt 103. A drive motor 107 mounted on a left-side portion of the supporting frame 77 is connected through its output shaft to the pulley 101L. Owing to the above configuration, when the drive motor 107 is operative the slider 105 is moved in the X-direction through the running belt 103. A cantilever-like member 111, which extends in the Y-direction, of a work holding means 109 (also called "manipulator") is attached to the slider 105. The cantilever-like member 111 is provided at free and proximal ends with rotatable pulleys 113, 115 around which a running belt 117 is engaged. A loader 119 is secured to a portion of the running belt 117. As shown in FIG. 5, a drive motor 121 is connected through its output shaft to the pulley 113. Owing to the configuration described above, when the drive motor 121 is operative the pulley 113 is rotated through the output shaft and therefore the loader 119 is moved in the Y-direction.

A moving body 127 provided with four arms 125 is mounted under the loader 119. The moving body 127 is moved in upward and downward directions by an actuator such as a hydraulic cylinder disposed in the loader 119 while being guided by upright guide bars 123, 123. Each arm 125 is provided at a lower surface with a suction cup 125 for sucking and releasing the work W. The arms 125 can be folded up as shown by imaginary lines on the left-side of FIG. 1 by means of a known revolving mechanism.

Owing to the above configuration, when the hydraulic cylinder is activated the moving body 127 is vertically moved and therefore the arms 125 with suction cups 129 are moved vertically.

Now, an example of the operations of the transfer device of the present invention is explained. In this example, the first or right-hand stacker 5R is used for storing the materials, while the second or left-hand stacker 5L is used for storing the products. In the beginning, the work holding means 109 stands by at the first stacker side, while the pallet carrying elevator 75 stands by at a position where a material is taken out. In addition, a right-hand processing pallet Pk is held under the first pallet supporter 91, while a left-hand processing pallet Pk is held under the second pallet supporter 93. No material or product is supported on the processing pallets Pk. Furthermore, the worktable 13 stands by on the right-side, or in front of the right-hand stacker 5R.

From this state the processing machine and the transfer device operate as explained below.

(1) The traverser 99 is moved in the leftward direction in FIG. 2 to clamp a pallet P which carries materials and is stored on the shelf 3 in the first stacker 5R and then moved back in order to discharge the pallet P onto the first pallet supporter 91. (This state is shown in FIG. 5, however the materials on the discharged pallet P are omitted in the drawing.)

(2) Then, the moving body 127 of the work holding means 109 is lowered to suck a piece of material by suction cups 129 and then raised to pick up the material.

(3) In the state where the material piece W is raised, the traverser 99 is moved to the left to return the pallet P, which carries remaining materials W, onto the shelf 3 in the first stacker 5R.

(4) The moving body 127 of the work holding means 109 is again lowered to put the material piece W on the right-hand processing pallet Pk by releasing the suction cups 129 and then raised to stand by.

(5) The pallet carrying elevator 75 is then lowered to place the right-hand processing pallet Pk on the worktable 13 which stands by in front of the first stacker 5R. When the pallet Pk is placed on the worktable 13, the pallet Pk is in contact with the worktable and slightly raised. Therefore, a gap is caused between each supporting piece 95 and the pallet Pk, and as a result every supporting piece 95 becomes free. After it, the drive means (not shown) is activated to pull the wires 96 to rotate the supporting pieces 95. As a result, the right-hand processing pallet Pk is disengaged from the elevator 75.

(6) The pallet carrying elevator 75 is lifted up to a material taking-out position for the preparation of next processing, while the worktable 13 of the processing machine is moved to the central part of the process ink machine, where the laser processing head 33 exists.

(7) Laser processing is performed with respect to the material piece W on the processing pallet Pk placed on the worktable 13.

During the laser processing of (7) the following operations are carried out.

(8) Operations of (1)–(3) are performed.

(9) Next, the slider 105 is moved leftwardly above the second pallet supporter 93 of the second stacker 5L.

(10) The moving body 127 of the work holding means 109 is lowered to put the newly taken material piece W on the left-hand processing pallet Pk provided under the second pallet supporter 93 by releasing the suction cups 129 and is raised up to the original position.

(11) At the completion of the above operation (7), the worktable 13 is caused to stand by on the right side of the processing machine.

(12) The pallet carrying elevator 75 is lowered. Then, the supporting pieces 95 are returned to the original position by pulling the wires 96 in the opposite direction to hold, at the lower portion of the first pallet supporter 91, the right-hand processing pallet Pk which carries the product G on the worktable 13.

(13) The worktable 13 is moved to the left-side of the laser processing apparatus 1.

(14) The left-hand processing pallet Pk, which carries the material piece W, is put on the worktable 13 by rotating the supporting pieces 97.

(15) The pallet carrying elevator 75 is raised up to a product discharging position.

(16) The worktable 13 is moved to the central position, and laser processing is performed with respect to the material W on the left-hand processing pallet Pk.

(17) The slider 105 is moved over the first pallet supporter 91 of the first stacker 5R.

(18) The moving body 127 of the work holding means 109 is lowered to suck the product G by suction cups 129 and then raised up to a stand by position to pick up the product G.

(19) The slider 105 is moved over the second pallet supporter 93.

(20) The product pallet P is withdrawn by means of the traverser 99 from the second slacker 5L, which serves as a product slacker, onto the second pallet supporter.

(21) The moving body 127 of the work holding means 109 is lowered to place the product G on the product pallet P by releasing the suction cups 129 and then raised up to a stand by position.

(22) The processing pallet Pk is stored in the second slacker 5L.

(23) The slider 105 is moved over the first pallet supporter 91.

(24) Then, the above operations (1), (2), (3), and (4) are performed.

(25) when laser processing is completed with respect to the material on the left-hand processing pallet P, the worktable 13 stands by on the left side of the laser processing apparatus 1.

(26) The pallet carrying elevator is lowered, and the left-hand processing pallet Pk is hold under the second pallet supporter 93 by rotation of the supporting pieces 97.

(27) The worktable 13 is moved to the right side of the laser processing apparatus.

(28) The right-hand processing pallet Pk is put on the worktable 13 by rotation of the supporting pieces 95.

(29) The pallet carrying elevator 75 is raised up to a product discharging position.

(30) Laser processing is performed with respect to the material W on the right-hand processing pallet Pk.

During the above operation (30), the following operations (31)–(33) are performed.

(31) The slider 105 is moved over the second supporting pieces 93.

(32) The moving body 129 of the work holding means 109 is lowered to pick up the product G on the left-hand processing pallet by the suction cups 129 and is then raised up to a stand by position.

(33) Then, the above operations (20)–(23) are performed.

An automated operation will be performed by repeating the above operations (1)–(33). Small scraps (holing scraps of small size, etc.) drop through holes formed in the pallet P into the inside of the laser processing apparatus, while large scraps (remaining bar-like scraps after products are taken out, holing scrap of large size) are caught by the work holding means 109. If the materials are processed with micro- or hair-joing processing, such scraps are not produced.

Since the first and second stackers 5R, 5L are provided beside the laser processing apparatus 1 as described above, transfer of the pallets between the stackers and the processing machine will be carried out quickly. Therefore, the processing machine can be used continuously without stopping and as a result the working efficiency or productivity of the laser processing apparatus is increased.

This invention is not limited to the embodiment described above and can be carried out in other forms. In this embodiment, the first and second stackers 5R, 5L are disposed beside the laser processing apparatus 1. However, only one stacker may be used.

Furthermore, in this embodiment, the first and second stackers 5R, 5L serve respectively as material stacker and product stacker, however the converse is equally possible. The material and product pallets may be stored in the same stacker. The product with micro-joint processing may be handled in the same manner.

INDUSTRIAL APPLICABILITY

As is understood from the above description, this invention is useful in industry since transfer of the pallets into or out from the stacker and processing machine is performed quickly and working efficiency or productivity of the processing machine is increased.

We claim:

1. A device for transferring materials and products with respect to a worktable (13) of a processing machine, comprising:
   a pallet stacker (5R, 5L) having a plurality of shelves to and from which material and product pallets are passable and dischargeable; and
   a pallet carrying elevator (75) provided in a vertically movable manner with respect to the pallet stacker (5R, 5L), the pallet carrying elevator being able to support and pass and discharge the pallet with respect to the shelves, wherein the pallet carrying elevator (75) is provided at an upper portion thereof with a work holding portion (109) for holding the material and product and at a lower portion thereof with a holding device (95) for holding and releasing a processing pallet (Pk), for passing and discharging the processing pallet (Pk) with respect to the worktable (13), and wherein further the pallet carrying elevator (75) includes a pallet supporter (91) for supporting the pallet; and the work holding portion (109) includes a movable body (127) that is vertically movable relative to the pallet supporter (91), and a pick-up means provided on the vertically movable body (127), for picking up a material or product.

2. The device of claim 1, wherein the pick-up means includes a suction cup.

3. The device of claim 1, wherein the work holding portion further includes a bracket (111) having a longitudinal axis, and a loader (119) supported on the bracket (111) so as to be movable along the longitudinal axis of the bracket (111), wherein the movable body (127) is supported on the loader (119) so as to be movable in the vertical direction.

4. The device of claim 3, wherein the work holding portion further includes a horizontal arm (125) supported on the movable body (127), for supporting the pick-up means (129).

5. The device of claim 4, wherein the pick-up means includes a suction cup.

6. The device of claim 3, wherein the pick-up means includes a plurality of suction cups, and the work holding portion includes a plurality of horizontal arms each supporting each suction cup of the plurality of suction cups.

7. A device for transferring materials and products with respect to a processing machine, comprising:

first and second stackers (5R, 5L) disposed adjacent to each other, each stacker having a plurality of pallet shelves (3) to and from which a plurality of material or product pallets (P) are passable and dischargeable;

a vertically movable pallet carrying elevator (75) extending between the first and second stackers (5R, 5L), the pallet carrying elevator being provided with first and second pallet supporters (91, 93), the first pallet supporter (91) being able to support the material or product pallet discharged to a position corresponding to the first stacker (5R), the second pallet supporter (93) being able to support the material or product pallet at a position corresponding to the second stacker (5L);

a first supporting device (95) mounted under the first pallet supporter (91), for supporting and releasing a processing pallet to be supported on a worktable of the processing machine;

a second supporting device (95) mounted under the second pallet supporter (93), for supporting and releasing a processing pallet to be supported on a worktable of the processing machine;

a slider (105) mounted on the pallet carrying elevator, the slider being movable to and fro between the positions corresponding to the first and second stackers; and a work holding means (109) mounted on the slider, for holding and releasing the material or product on the material, product, or processing pallet (P, Pk) supported on the first and second pallet supporters (91, 93).

* * * * *